(12) United States Patent
Masalkar

(10) Patent No.: US 8,169,701 B2
(45) Date of Patent: *May 1, 2012

(54) DIFFUSING SCREEN

(75) Inventor: Prafulla Masalkar, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/188,139

(22) Filed: Jul. 21, 2011

(65) Prior Publication Data

US 2011/0273673 A1    Nov. 10, 2011

Related U.S. Application Data

(63) Continuation of application No. 12/363,935, filed on Feb. 2, 2009, now Pat. No. 8,004,759.

(51) Int. Cl.
    *G03B 21/56*    (2006.01)
(52) U.S. Cl. ....................................... 359/460
(58) Field of Classification Search ............ 359/460, 359/452–453, 443
    See application file for complete search history.

(56) References Cited

U.S. PATENT DOCUMENTS

| | | | | |
|---|---|---|---|---|
| 3,909,111 | A * | 9/1975 | Meyerhofer | 359/460 |
| 4,372,639 | A * | 2/1983 | Johnson | 359/15 |
| 4,960,314 | A * | 10/1990 | Smith et al. | 359/15 |
| 5,280,371 | A | 1/1994 | McCartney, Jr. et al. | |
| 6,046,846 | A | 4/2000 | van de Ven | |
| 6,061,177 | A * | 5/2000 | Fujimoto | 359/443 |
| 6,113,251 | A * | 9/2000 | Miyata | 362/333 |
| 6,327,083 | B1 * | 12/2001 | Goldenberg et al. | 359/453 |
| 6,466,368 | B1 * | 10/2002 | Piepel et al. | 359/456 |
| 6,733,147 | B2 | 5/2004 | Wang et al. | |
| 6,791,639 | B2 | 9/2004 | Colgan et al. | |
| 7,034,923 | B2 * | 4/2006 | Bakker | 355/67 |
| 7,099,079 | B2 | 8/2006 | Hibi et al. | |
| 7,339,742 | B2 | 3/2008 | Amitai et al. | |
| 7,362,503 | B2 | 4/2008 | Yoshikawa et al. | |
| 7,430,358 | B2 | 9/2008 | Qi et al. | |
| 2006/0250392 | A1 | 11/2006 | Vesely et al. | |
| 2007/0133088 | A1 * | 6/2007 | Lippey et al. | 359/443 |

OTHER PUBLICATIONS

Takaki Yasuhiro, "Three-Dimensional Display with 64 Horizontal Parallaxes", Retrieved at<<http://tfcg.elis.ugent.be/student/scripties/2008/polyscopic/Artikels/Takaki@ASID2002_S2-094.pdf>>, pp. 4.

Wood, et al. "Impact of Screen Construction on Sharpness and Contrast in MDTV Displays", Retrieved at<<http://www.brightviewtechnologies.com/downloads/mtf-whitepaper06_20.pdf>>, "Bright View Technologies", pp. 1-6.

"Holographic Diffusers can Efficiently and Cost Effectively Distribute Light", Retrieved at<<http://statusreports.atp.nist.gov/reports/93-01-0205PDF.pdf>>, pp. 5.

* cited by examiner

*Primary Examiner* — Christopher Mahoney
(74) *Attorney, Agent, or Firm* — Alleman Hall McCoy Russell & Tuttle LLP

(57) ABSTRACT

Various embodiments related to a rear projection display screen configured to reduce an intensity of light at a viewing angle at which the light is less likely to be viewed by a user are disclosed. One disclosed embodiment provides a diffusing screen comprising a sheet-like structure transparent to one or more wavelengths of light. The sheet-like structure has a viewing surface and comprises a diffusing pattern configured to create destructive interference of a selected wavelength of light traveling in a direction normal to a plane of the viewing surface of the screen.

20 Claims, 5 Drawing Sheets

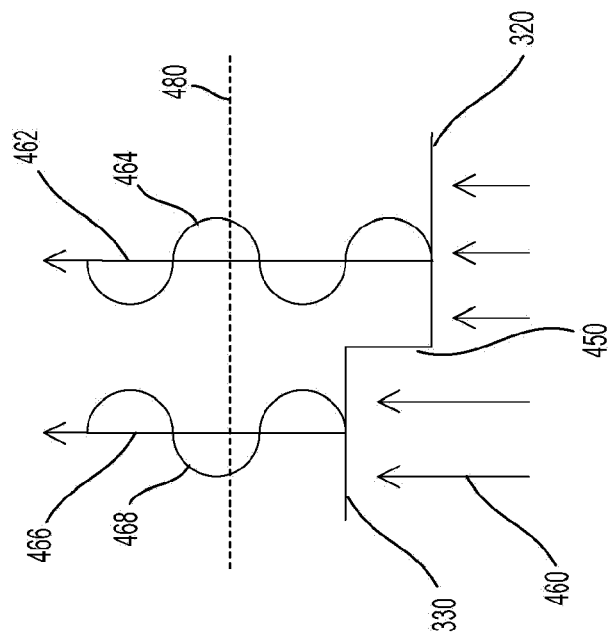
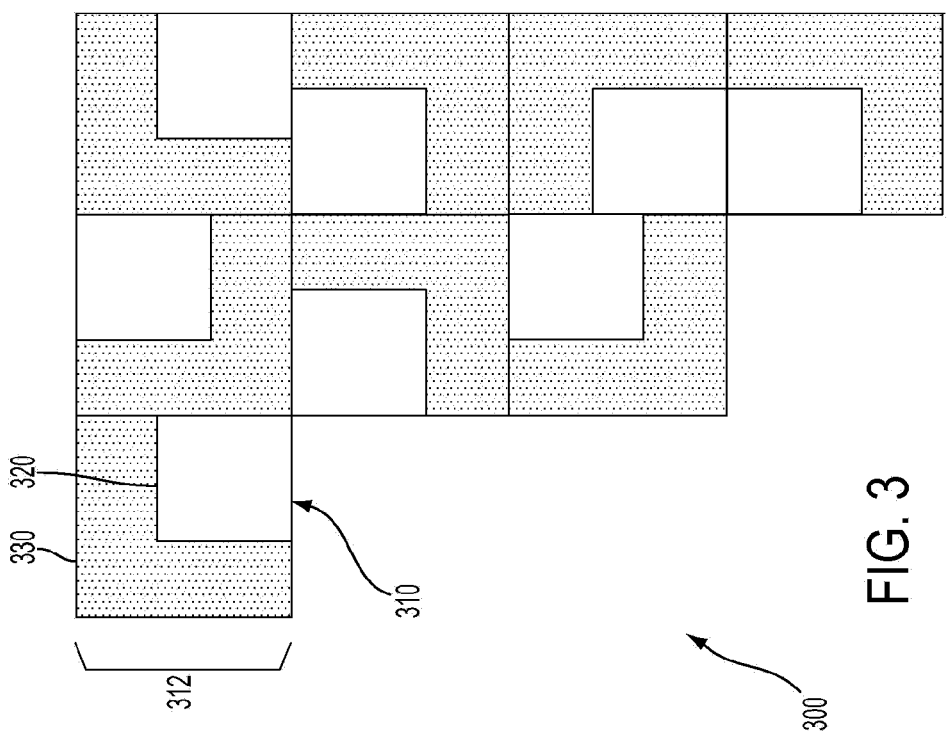
FIG. 4
FIG. 3

DIFFUSING SCREEN

CROSS-REFERENCE TO RELATED APPLICATIONS

This application is a continuation of U.S. patent application Ser. No. 12/363,935, titled "DIFFUSING SCREEN" and filed Feb. 2, 2009, the entire disclosure of which is hereby incorporated by reference.

BACKGROUND

Diffusing screens are used to redirect light and produce a desired spatial distribution of light intensity from a screen. Light incident on a screen is refracted or reflected as it moves from the screen into another media of transmission (e.g. air). By the use of a screen with a varied surface topography, light is sent in different directions, distributing the light across a range of angles relative to a plane of the screen.

A diffusing screen may be paired with an image source, such as a projection device, to distribute light for a projected image. In such applications, it is often desirable to distribute light evenly across a range of viewing directions relative to the screen. Therefore, diffusing screens are often configured to produce a Lambertian distribution of reflected light or the like.

SUMMARY

Various embodiments are disclosed herein that relate to a rear projection display screen configured to reduce an intensity of light at a viewing angle at which the light is less likely to be viewed by a user. For example, one disclosed embodiment provides a diffusing screen comprising a sheet-like structure transparent to one or more wavelengths of light, wherein the sheet-like structure has a viewing surface and comprises a diffusing pattern configured to create destructive interference of a selected wavelength of light traveling in a direction normal to a plane of the viewing surface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 shows a magnified top view of an embodiment of a display screen comprising a viewing surface with a diffusing pattern.

FIG. 4 shows a sectional view of the embodiment of FIG. 3.

DETAILED DESCRIPTION

As described above, many diffusing screens for projection display systems are configured to produce a Lambertian, or other relatively uniform, distribution of transmitted or reflected light. This is because it is desirable in many applications for a projected image to have a similar brightness across a range of viewing angles. As a specific example, a rear projection television with a vertically oriented display screen may have a diffusing screen configured to provide an image of similar light intensity across a range of angles at which viewers may potentially sit in front of the television.

However, in other applications, a display screen may be horizontally oriented. For example, some interactive computing devices may be configured to have a horizontally oriented rear projection screen similar to a table top around which users sit. Because users of such a device view such a display screen predominantly at an angle that is diagonal to the display screen surface plane, light projected in a direction normal to the screen does not reach viewers seated around such a device, and is therefore wasted.

The reduction of such wasted light may lead to various advantages. For example, where a relatively brighter, higher power light source, such as an arc lamp, is employed, reducing such wasted light may lead to more efficient use of power. Likewise, where relatively dimmer, lower power light source, such as an LED array, is used, reducing such wasted light may allow more light to be directed toward viewers, thereby improving the brightness perceived by views.

Therefore, various embodiments are disclosed herein related to a rear projection display screen configured to reduce an intensity of light at a viewing angle at which the light is less likely to be viewed by the user. Before discussing these embodiments in detail, an example device utilizing a horizontal display screen is described.

Figure 1:
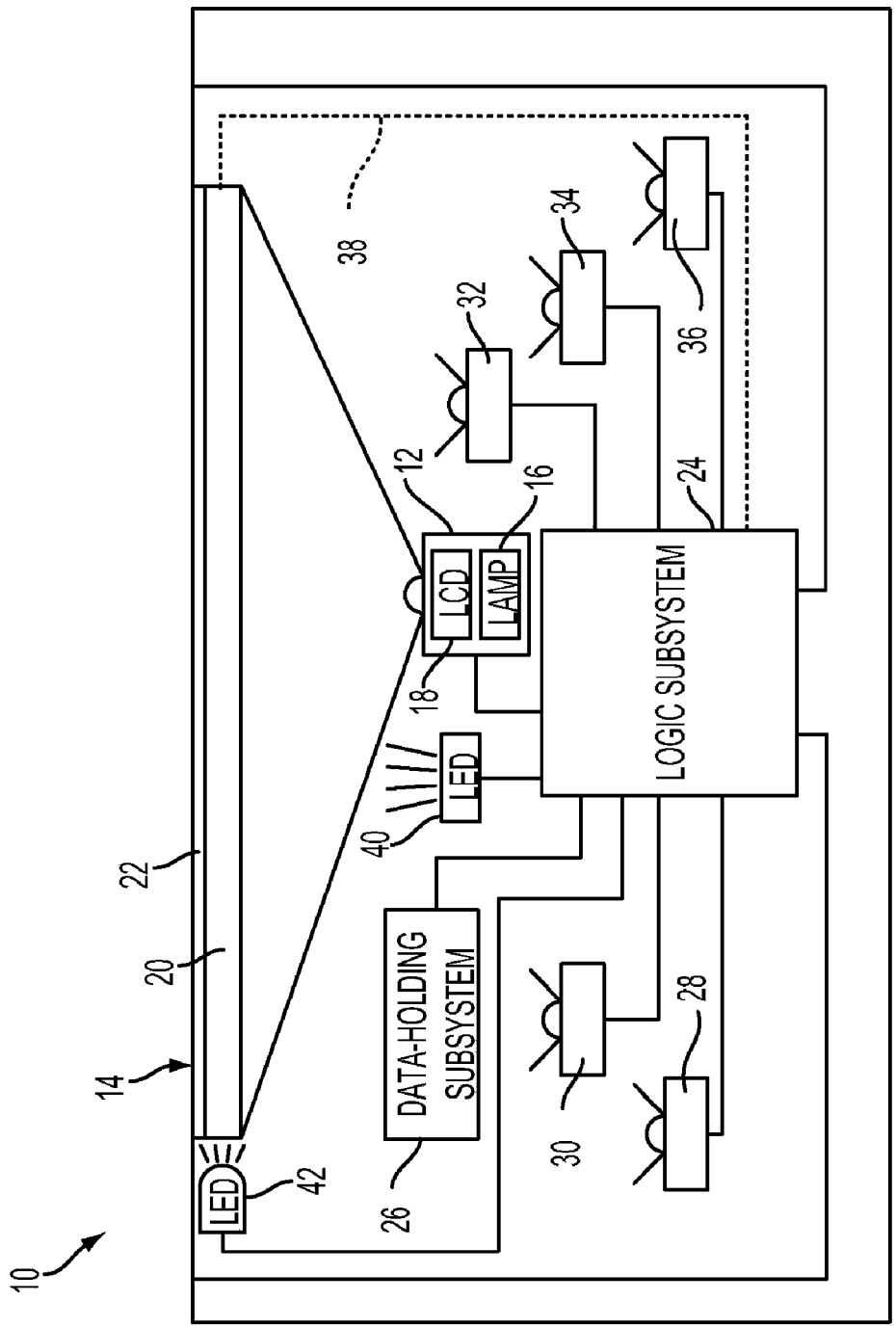
FIG. 1 shows a block diagram of an embodiment of an interactive display device that comprises an embodiment of a diffusing screen.

FIG. 1 shows a schematic depiction of an embodiment of an interactive display device in the form of a surface computing system 10. The surface computing system 10 comprises a projection display system having an image source 12, and a display screen 14 onto which images are projected. Image source 12 may be a rear projector that can project images onto display screen 14. Image source 12 may comprise a light source 16, such as the depicted wideband source arc lamp 16, a plurality of LEDs configured to emit light of three colors (e.g. three primary colors), and/or any other suitable light source. Image source 12 may also comprise an image-producing element 18, such as the depicted LCD (liquid crystal display), an LCOS (liquid crystal on silicon) display, a DLP (digital light processing) display, or any other suitable image-producing element.

Display screen 14 may include a clear, transparent portion 20, such as a sheet of glass, and a diffuser, referred to herein as diffuser screen layer 22, disposed over the clear, transparent portion 20. In some embodiments, an additional transparent layer (not shown) may be disposed over diffuser screen layer 22 to provide a smooth look and feel to the display screen. In this way, transparent portion 20 and diffuser screen layer 22 can form a non-limiting example of a touch-sensitive region of display screen 14. It will be understood that the diffuser screen layer may either be a separate part from the clear, transparent portion 20, or may be formed in a surface of, or otherwise integrated with, the clear, transparent portion 20.

Continuing with FIG. 1, surface computing system 10 may further includes a logic subsystem 24 and data holding subsystem 26 operatively coupled to the logic subsystem 24. The surface computing system 10 may include a user input device (not shown), such as a wireless transmitter and receiver configured to communicate with other devices.

To sense objects that are contacting or near to display screen 14, surface computing system 10 may include one or more image capture devices (e.g., sensor 28, sensor 30, sensor 32, sensor 34, and sensor 36) configured to capture an image of the backside of display screen 14, and to provide the image to logic subsystem 24. The diffuser screen layer 22 can serve to reduce or avoid the imaging of objects that are not in contact with or positioned within a few millimeters or other suitable distance of display screen 14, and therefore helps to ensure that at least objects that are touching the display screen 14 are detected by the image capture devices. While the disclosed embodiments are described in the context of a vision-based multi-touch display system, it will be understood that the embodiments may be implemented on any other suitable touch-sensitive display system, including but not limited to capacitive and resistive systems.

The image capture devices may include any suitable image sensing mechanism. Examples of suitable image sensing mechanisms include but are not limited to CCD and CMOS image sensors. Further, the image sensing mechanisms may capture images of the display screen 14 at a sufficient frequency or frame rate to detect motion of an object across the display screen 14. In other embodiments, a scanning laser may be used in combination with a suitable photodetector to acquire images of the display screen 14. Display screen 14 may alternatively or further include an optional capacitive, resistive or other electromagnetic touch-sensing mechanism, which may communicate touch input to the logic subsystem via a wired or wireless connection 38.

The image capture devices may be configured to detect reflected or emitted energy of any suitable wavelength, including but not limited to infrared and visible wavelengths. To assist in detecting objects placed on display screen 14, the image capture devices may further include an illuminant, such as one or more light emitting diodes (LEDs). FIG. 1 shows an infrared light source 40 and an infrared light source 42 configured to produce infrared light. Light from the illuminant may be reflected by objects contacting or near display screen 14 and then detected by the image capture devices. The use of infrared LEDs as opposed to visible LEDs may help to avoid washing out the appearance of projected images on display screen 14.

In some examples, one or more of infrared light source 90 and/or infrared light source 42 may be positioned at any suitable location within surface computing system 10. In the example of FIG. 1, an infrared light source 42 may be placed along a side of display screen 14. In this location, light from the infrared light source can travel through display screen 14 via internal reflection, while some light can escape from display screen 14 for reflection by an object on the display screen 14. In other examples, an infrared light source 40 may be placed beneath display screen 14.

It will be understood that the surface computing device 10 may be used to detect any suitable physical object, including but not limited to, fingers, styluses, cell phones, cameras, other portable electronic consumer devices, barcodes and other optically readable tags, etc.

Figure 2:
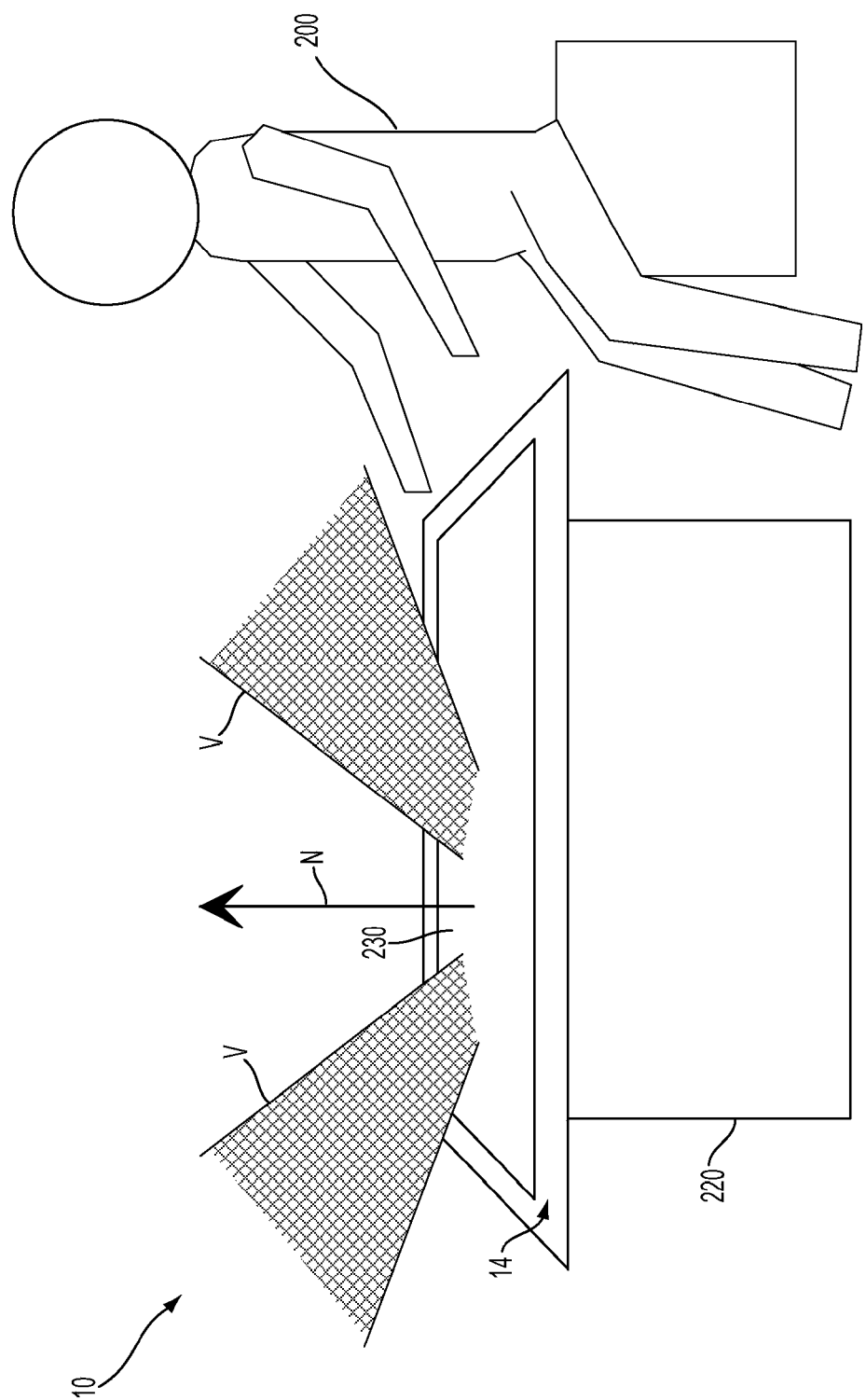
FIG. 2 shows a schematic depiction of a spatial range of light emitted from the interactive display device of FIG. 1 that is viewable by a user during ordinary use.

FIG. 2 shows a use environment for a user 200 of the surface computing device. The surface computing device 10 comprises a housing 220 that supports the previously described display screen 14 in a horizontal orientation. The display screen 14 comprises a sheet-like structure with a viewing surface 230 that faces outwardly toward users of the surface computing device 10. As described above, the viewing surface may comprise a surface of the diffuser screen layer 22, and/or may comprise a transparent, smooth layer placed over the diffuser screen layer 22. The term "viewing surface" also may be used herein to describe the surface of the diffuser screen layer 22 that faces a viewer during use, whether or not that surface of the diffuser screen layer 22 is actually an outermost surface of the display screen 14.

As described above, the use of a diffusing screen with a Lambertian distribution of transmitted light intensities may result in light transmitted along directions not ordinarily viewed by a user 200 seated at the surface computing device 10. Therefore, the diffuser screen layer 22 may comprise such a diffusing screen and be configured to create destructive interference of selected wavelengths of visible light from the light source along such directions.

For example, in the depicted embodiment, if a Lambertian diffusing screen were used as the diffuser screen layer 22 of surface computing device 10, a substantial portion of the light emitted from and/or transmitted through the viewing surface 230 would be projected in a direction normal to a plane of the display screen 240 and/or viewing surface 230 (i.e., along direction N). However, as depicted in FIG. 2, a user 200 tends to view images displayed on the display screen 14 within a diagonally oriented angle range V. Therefore, light directed along the normal direction N is not as useful as light directed within angle range V.

Therefore, to reduce an amount of light transmitted in directions not ordinarily viewed by a user of the surface computing device 10, the diffuser screen layer 22 may comprise a diffusing pattern configured to create destructive interference of selected wavelengths of light traveling in the direction N, normal to the plane of the viewing surface 230.

The diffusing pattern of the viewing surface 230 may be configured according to the nature of the image source. For example, when the image source comprises an arc lamp, the diffusing pattern may be configured to create destructive interference across a distribution of wavelengths of light centered, for example, on a peak green light having a wavelength between 520 nanometers (nm) and 590 nm In further examples, when the image source comprises a plurality of LEDs, the diffusing pattern may be configured to create destructive interference around each of three wavelengths of light corresponding to three colors (e.g., red, green and blue).

Further still, the diffusing pattern may be configured to create constructive interference of an image by creating constructive interference for one or more wavelengths of visible light within a range of angles (e.g., angle range V). In some embodiments, the angle range may be a distribution from a first angle to a second angle (e.g. 15 degrees from the viewing surface 230 to 75 degrees), and may be centered about an angle at which a maximum intensity is desired. In one specific embodiment, the angle range may be a lobe or bell distribution centered on a maximal angle of 51 degrees from the viewing surface 230. It will be understood that in alternate configurations, the angle ranges and diffusing pattern configuration may vary according to, for example, an expected location of the user, configuration and orientation of the viewing surface 230, and the like, and that destructive and constructive interference may be created at any suitable angles relative to a plane of the viewing surface.

The diffuser screen layer 22 may have any suitable structure configured to create destructive interference of selected wavelengths of light traveling in a direction normal to a plane of the viewing surface. For example, in some embodiments, the diffusing pattern may comprise a plurality of pattern elements. The pattern elements may be arranged to create destructive interference along the direction N by various mechanisms, including but not limited to diffraction elements and/or viewing surface topography elements. In some embodiments, the diffusing pattern may comprise a terraced topography that exists at a boundary between two media of different indices of refraction, such as the screen and air, or two or more different screen materials. Further, in some embodiments, the diffusing pattern may be formed in or embedded within the sheet-like structure of the display screen 240, while in other embodiments, the diffusing pattern may be formed on the viewing surface 230, or a surface of the diffuser screen layer 22 opposite the viewing surface. Further examples of such embodiments are described herein below.

FIG. 3 shows an example embodiment of a diffusing pattern 300 formed on a diffusing screen. The diffusing pattern 300 is formed in a viewing surface of the diffusing screen, and comprises a plurality of pattern elements that form a topography of the viewing surface. Each pattern element 310 comprises a first terrace 320 and a second terrace 330 separated by a distance in a direction normal to the plane of the viewing surface corresponding to one half of a selected wavelength of visible light plus an integer number of the selected wavelength of visible light. In some embodiments (for example, where destructive interference is centered on a single wavelength), each pattern element 310 may have the same separation distance. In other embodiments (for example, where destructive interference is centered about more than one wavelength), different pattern elements 310 may comprise terraces with different separation distances.

Each pattern element may have any suitable dimensions. For example, it may be desirable to have pattern elements of a sufficiently small size not to be visible to a view sitting an average viewing distance from the screen during use. In some embodiments, individual pattern elements may have a feature size 312 of between 0.1 and 0.4 microns. Other embodiments may have either larger or smaller feature sizes than this range.

The location and spatial arrangement of the first terrace relative to the second terrace may vary for each element in a pseudo-random arrangement when viewed from the top down (as shown in FIG. 3). Alternatively, a single element may be repeatedly patterned to produce a periodic array. Further still, the location of the first terrace relative to the second terrace of each element may be determined independent of all other elements in the diffusing pattern, so that the pattern is randomly arranged. FIG. 3 shows rectilinearly shaped terraces, but it will be understood that a pattern element according to the present disclosure may have any suitable shape, including but not limited to polygonal, oval, round, polycurved, and/or combinations thereof. The use of curved pattern elements may help to avoid periodic effects in light transmitted through the diffusing screen.

The first terrace 320 and second terrace 330 may have any suitable relative surface areas. For example, in some embodiments, a surface area of the first terrace 320 is equal to a surface area of the second terrace 330. In other embodiments, the first terrace 320 and second terrace 330 may have different surface areas, depending upon a desired magnitude of destructive interference to be achieved. Further, in some embodiments, a sum of the surface areas of all first terraces 320 may be equal to a sum of all of the surface area of second terraces 330, while in other embodiments these sums may not be equal.

Turning now to FIG. 4, the embodiment of FIG. 3 is shown from a profile view. The first terrace 320 is shown separated from the second terrace 330 by a transition 450 with a transition height of one half of a wavelength of light at which destructive interference is desired. The depicted transition 450 comprises a step substantially parallel to the normal direction. Alternatively, in other embodiments, the transition may comprise a slope between terraces that is not parallel to the normal direction.

Light 460 travelling normal to an example viewing surface is transmitted through the first terrace 320 and the second terrace 330. A first example light ray 462 having the selected wavelength is shown with phase 464. A second example light ray 466 having the selected wavelength is shown with phase 468. The phases of the two rays add to zero, for example, along dashed line 480. The transition height may be tuned so that a desired wavelength may undergo destructive interference at a desired wavelength in the manner described above. In this way, a diffusing pattern may create destructive interference for light of a selected wavelength of light traveling normal to the viewing surface. Further, such a pattern also may create constructive interference in a direction toward a viewer, thereby increasing an apparent intensity of the light to the viewer.

Figure 5:
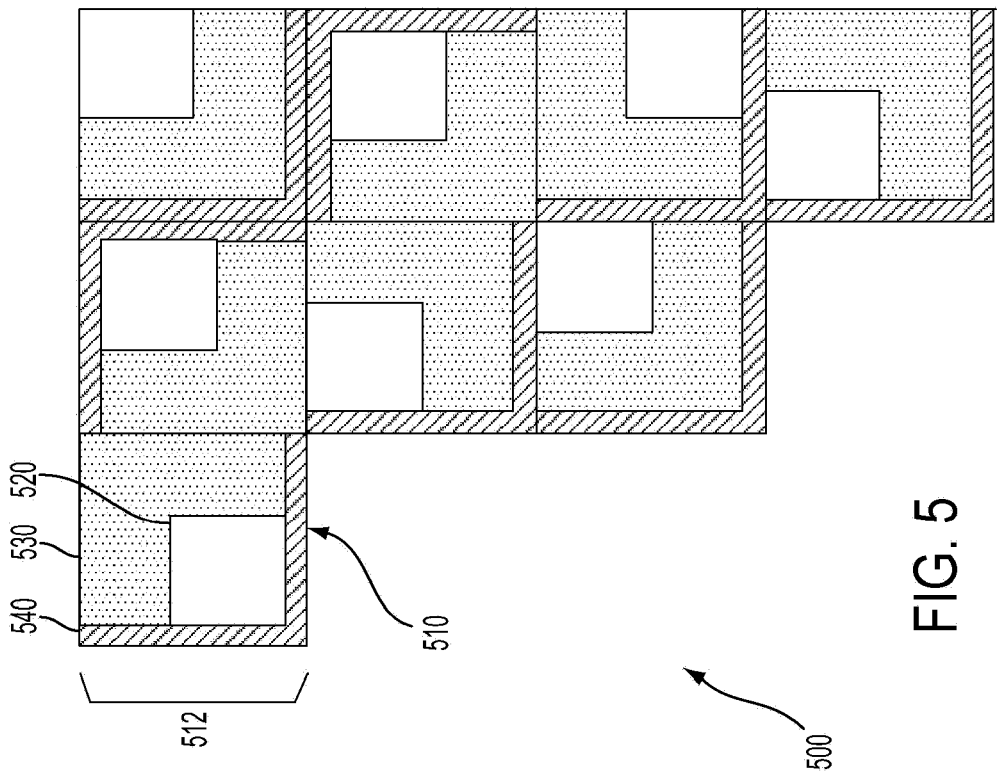
FIG. 5 shows a magnified top view of another embodiment of a display screen comprising a viewing surface with a diffusing pattern.

FIG. 5 shows another embodiment of a diffusing pattern for a diffusing screen. As with the embodiment of FIGS. 3-4, the diffusing pattern 500 is formed in an example viewing surface of the sheet-like structure and comprises a plurality of pattern elements 510, forming a topography of the viewing surface. Each pattern element 510 comprises a first terrace 520, a second terrace 530 separated from the first terrace 520 by a distance corresponding to one half of a selected wavelength of visible light plus an integer number of the selected wavelength of visible light, and a third terrace 540 separated from the second terrace by a distance corresponding to an integer number of the selected wavelength of visible light. Similar to description of FIG. 3 above, each element may have the same separation distances, or may have different separation distances, depending upon the wavelength or wavelengths at which destructive interference is desired. Further, as described above in the context of FIG. 3, the pattern elements 510 may have any suitable feature size 512, including but not limited to sizes between 0.1 and 0.4 microns.

The location of the first terrace relative to the second and third terraces may vary for each pattern element (and, similarly, the location of the second terrace relative to the first and third) so that the elements may form a pseudo-random arrangement when viewed from the top down (as shown in FIG. 5). Alternatively, a single pattern element arrangement may be repeated across the diffusing screen produce a periodic array. Further still, the location of the first terrace relative to the second terrace (and likewise the second terrace in relation to the third terrace) may be determined for each element independent of all other elements in the diffusing pattern, so that the pattern is randomly arranged. Further, as described above for FIG. 3, FIG. 5 shows rectilinearly shaped terraces, but in other embodiments, each terrace and element may have any other suitable shape.

The first terrace 520, second terrace 530 and third terrace 540 may have any suitable relative surface areas. For example, in some embodiments, a surface area of a sum of the first terrace 520 and third terrace 540 is equal to a surface area of the second terrace 530. In other embodiments, relative surface areas of the first terrace 520, second terrace 530 and third terrace 540 may have any other suitable values, depending upon a desired magnitude of destructive interference. Likewise, in some embodiments, a sum of the surface areas of all first terraces 520 and third terraces 540 across the diffusing screen may be equal to a sum of the surface areas of all second terraces, while in other embodiments these sums may not be equal.

Figure 6:
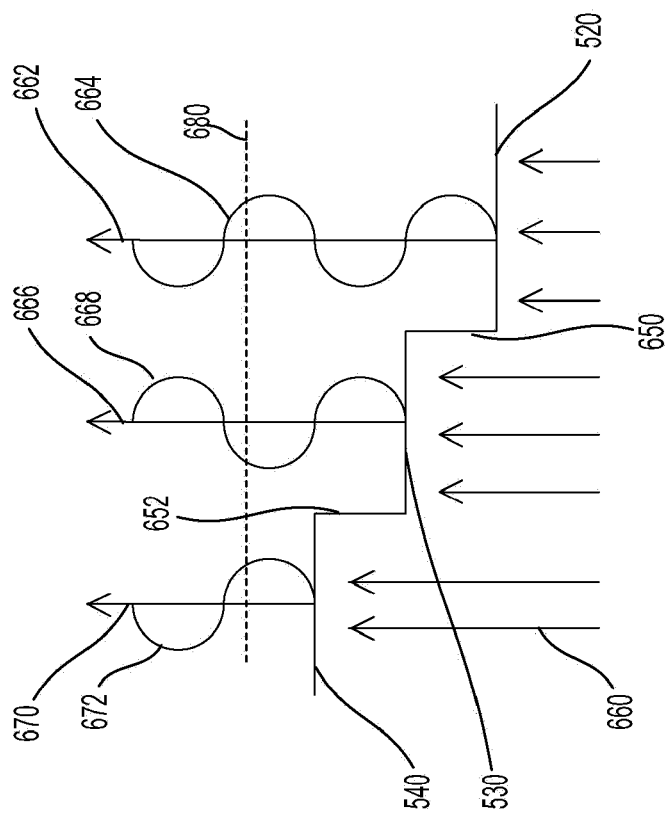
FIG. 6 shows a sectional view of the embodiment of FIG. 5.

Turning now to FIG. 6, the embodiment of FIG. 5 is shown from a profile view. The first terrace 520 is shown separated from the second terrace 530 by a transition 650 with a transition height of one half of an example selected wavelength. Further, the third terrace 540 is shown separated form the first terrace 520 by one selected wavelength and separated from the second terrace 530 by half the selected wavelength. The third terrace is separated from the second terrace by a second transition 652.

The depicted transition 650 and 652 comprises a step substantially parallel to the normal direction. In other embodiments, the transitions may comprise a slope between terraces that is not parallel to the normal direction. Further still in some examples, the transitions 650 and 652 may correspond to different wavelengths, further randomizing the diffusing pattern of such examples.

Continuing with FIG. 6, light 660 travelling normal to an example viewing surface is transmitted through the first terrace 520, the second terrace 530 and the third terrace 540. A first example light ray 662 having the selected wavelength is shown with phase 664. A second example light ray 666 having the selected wavelength is shown with phase 668. A third example light ray 670 having the selected wavelength is shown with phase 672 (the same phase as 664). The phases 672 and 662 are opposite the phase 668, such as along dashed line 680. In this way, a diffusing pattern may create destructive interference for light of a selected wavelength of light traveling normal to the viewing surface. Further, such a pattern also may create constructive interference in a direction toward a viewer, thereby increasing an apparent intensity of the light to the viewer.

While the first, second and third terraces are shown as spatially sequential in the depicted embodiments, in other embodiments, these structures may not be spatially sequential. For example, the second terrace (i.e. the terrace having an intermediate height) may be farther from the first terrace than the third terrace.

The screen surface topographies described above may be formed in any suitable manner. For example, in one embodiment, such terraced topographies may be formed by the rolling of a master on a optical material, for example, during solidification of a glass or polymerization, cross-linking, and/or solidification of a polymer. Further, such a topography also may be formed via casting, various molding techniques, etching, etc.

The topologies described with reference to FIGS. 3-6 may be formed on a viewing surface of a diffusing screen, or may be formed on a surface of a diffusing screen that faces away from a viewer. Further, in some embodiments, the topologies may be formed internally to the diffusing screen, for example, by forming the destructive interference-inducing diffusing topology in a surface of a first sheet of material, and then applying or forming a sheet or layer of another material over the diffusing surface on the first sheet of material. It will be understood that the other material may be selected to have a suitable refractive index to cause a desired diffuse optical effect. Further, it will be understood that other structures than those described above may be used in a diffusing screen to create destructive interference in a direction normal to a display screen. For example, a diffraction grating may be formed, for example, via printing onto a diffusing screen a grating pattern with a suitable material that is opaque to the selected visible wavelength or wavelengths at which the destructive interference is centered.

While disclosed herein in the context of a horizontal rear projection display system, it will be understood that the diffusing screens described herein also may be used with suitable front projection systems, and/or with display systems having screens oriented at any other suitable angle, including but not limited to vertical screens.

Figure 7:
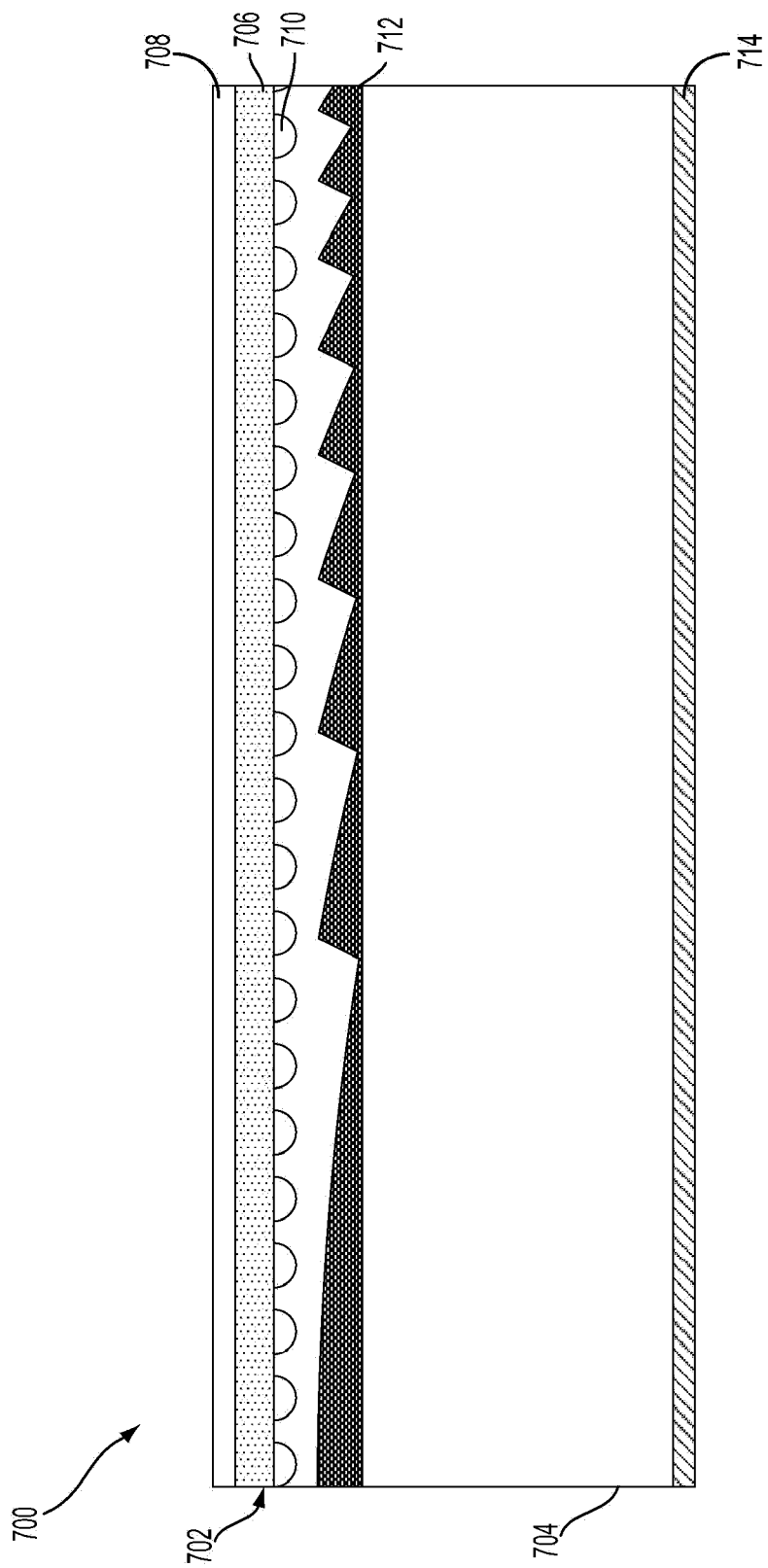
FIG. 7 shows another embodiment of a display screen.

FIG. 7 shows an example of a diffusing display screen 700 that illustrates several optional structures that may be used in various combinations with the above-described diffuser screens. Display screen 700 comprises a diffuser screen layer 702 and a transparent supportive structure 704, such as a sheet of glass or rigid transparent plastic. The diffuser screen layer 702 comprises a first diffuser 706 configured to create destructive interference of selected wavelengths of light traveling in a direction normal to a plane of the viewing surface, as described above. The diffuser screen layer also may optionally comprise a second diffuser 708, positioned either below (not shown) or above (as shown in FIG. 7) the first diffuser. The second diffuser may be configured to provide additional homogenization of light passing through the screen.

The diffuser screen layer 702 may further optionally comprise a lenticular lens array 710 positioned below the diffuser 706 to help reject ambient light and improve image contrast. In some embodiments, a microlens array may be used in place of or in addition to the lenticular lens array. Further, in various embodiments, the display screen system 700 also may optionally include a Fresnel lens structure 712, an anti-reflective coating 714, and/or any other suitable structures.

While disclosed herein in the context of specific example embodiments, it will be appreciated that the configurations and/or approaches described herein are exemplary in nature, and that these specific embodiments or examples are not to be considered in a limiting sense, because numerous variations are possible. The subject matter of the present disclosure includes all novel and nonobvious combinations and subcombinations of the various processes, systems and configurations, and other features, functions, acts, and/or properties disclosed herein, as well as any and all equivalents thereof

The invention claimed is:

1. In a rear projection display device, a method of projecting an image via a rear projection display screen, the method comprising:
   directing light from a light source through a sheet-like structure transparent to one or more wavelengths of the light, the sheet-like structure having a viewing surface and comprising a diffusing pattern configured to create destructive interference of rays of selected wavelengths of light traveling in a parallel direction normal to a plane of the viewing surface; and
   destructively interfering rays of selected wavelengths of the light that are traveling in a parallel direction normal to a plane of the viewing surface.

2. The method of claim 1, wherein directing light through the sheet-like structure comprises directing light through a sheet-like structure comprising a randomly-arranged diffusing pattern.

3. The method of claim 1, wherein directing light through the sheet-like structure comprises directing light through a sheet-like structure comprising a pseudo-randomly arranged diffusing pattern.

4. The method of claim 1, wherein directing light through the sheet-like structure comprises directing light through a sheet-like structure comprising a periodically arranged diffusing pattern.

5. The method of claim 1, wherein directing light through the sheet-like structure comprises directing light through a sheet-like structure comprising a diffraction grating.

6. The method of claim 1, wherein directing light through the sheet-like structure comprises directing light through a sheet-like structure in which the diffusing pattern is embedded.

7. The method of claim 1, wherein directing light through the sheet-like structure comprises directing light through a sheet-like structure comprising in which the diffusing pattern is formed in the viewing surface of the sheet-like structure.

8. A method of operating a display system, the display system comprising a housing, a display screen coupled to the housing, and an image source disposed within the housing and configured to project an image onto the display screen, the method comprising:
  projecting an image onto the display screen via light from the image source;
  directing the light from the image source through the display screen such that the light passes through a diffuser screen layer comprising a pattern having a plurality of pattern elements each comprising a first terrace and a second terrace separated by a distance corresponding to one half of a selected wavelength of visible light plus an integer number of the selected wavelength of visible light; and
  destructively interfering light of the selected wavelength in a direction normal to the viewing surface.

9. The method of claim 8, wherein destructively interfering light of the selected wavelength comprises destructively interfering light across a distribution centered on a peak green light having a wavelength between 520 nanometers and 590 nanometers.

10. The method of claim 8, wherein destructively interfering light of the selected wavelength comprises destructively interfering light around three wavelengths corresponding to three colors.

11. The method of claim 8, wherein directing the light through the display screen comprises passing the light through a pattern comprising a transition between terraces, the transition comprising a step substantially parallel to the direction normal to the viewing surface.

12. The method of claim 8, wherein directing the light through the display screen comprises passing the light through a pattern comprising a transition between terraces, the transition comprising a slope between terraces that is not parallel to the direction normal to the viewing surface.

13. The method of claim 8, further comprising passing the light through first and second terraces having equal surface areas.

14. The method of claim 8, wherein the distance is a first distance, and wherein directing light through the display screen comprises passing light through a third terrace separated from the first terrace by a second distance corresponding to an integer number of a selected wavelength of visible light.

15. The method of claim 14, wherein a sum of a surface area of the first terrace and a surface area of the third terrace is equal to a surface area of the second terrace.

16. A method of operating a horizontal display system, the horizontal display system comprising a housing, a horizontally-oriented rear projection display screen coupled to the housing, an infrared light source disposed within the housing, and an image source disposed within the housing and configured to project an image onto the display screen, the display screen being transparent to one or more wavelengths of visible light and one or more wavelengths of infrared light, the method comprising:
  projecting a visible image onto the display screen via visible light from the image source;
  illuminating the display screen with infrared light from the infrared light source;
  directing the visible light through a diffuser screen layer of the display screen, the diffuser screen layer comprising a diffusing pattern with a plurality of pattern elements each comprising a first terrace and a second terrace separated by a distance corresponding to one half of a selected wavelength of visible light plus an integer number of the selected wavelength of visible light, the pattern configured to create destructive interference of the selected wavelength of visible light in a direction normal to the viewing surface; and
  destructively interfering visible light of the selected wavelength in a direction normal to the viewing surface.

17. The method of claim 16, wherein directing the visible light through the diffuser screen layer of the display screen comprises directing the visible light through a diffuser screen layer comprising pattern elements each having a terraced surface area with a feature size of between 0.1 and 0.4 microns.

18. The method of claim 16, further comprising constructively interfering visible light of a viewing wavelength of visible light at one or more angles within in a range of angles from 15 degrees from the viewing surface to 75 degrees from the viewing surface.

19. The method of claim 16, wherein the diffuser screen layer is a first diffuser, and further comprising passing the visible light through a second diffuser of the display screen.

20. The method of claim 16, wherein the display screen further comprises one or more of a lenticular array and a microlens array, and wherein directing the visible light through the display screen comprises directing light through the one or more of the lenticular array and the microlens array.

* * * * *